Figures 1, 2:
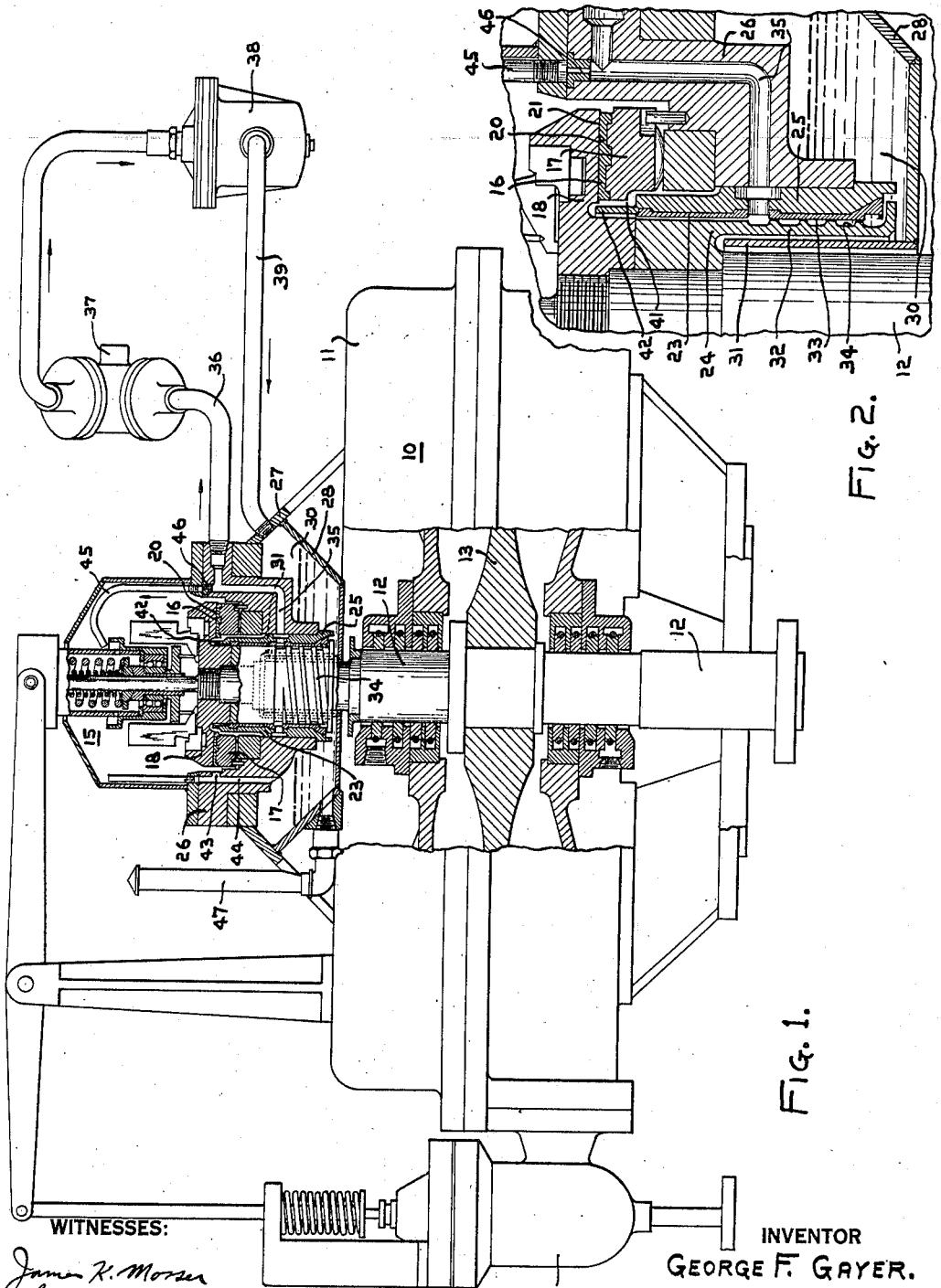

Oct. 27, 1942.        G. F. GAYER        2,300,284
LUBRICATION APPARATUS
Filed Aug. 28, 1940

WITNESSES:
James K. Mosser
S. K. Hart

INVENTOR
GEORGE F. GAYER.
BY
A. B. Reavis
ATTORNEY

Patented Oct. 27, 1942

2,300,284

UNITED STATES PATENT OFFICE 2,300,284

LUBRICATION APPARATUS

George F. Gayer, Prospect Park, Pa., assignor to Westinghouse Electric & Manufacturing Company, East Pittsburgh, Pa., a corporation of Pennsylvania Application August 28, 1940, Serial No. 354,513

1 Claim. (Cl. 184—6)

The invention relates to a lubricated bearing construction for a vertical spindle normally operating in a high temperature environment and it has for an object to provide means for circulating oil through a cooler for heat dissipation and to provide oil adequate in quantity and at a sufficiently low temperature for proper lubrication of the bearing surfaces.

A further object of the invention is to provide apparatus, for example, an elastic fluid turbine, having a vertical spindle, which has weight thereof sustained by a thrust bearing and wherein the axis is maintained in predetermined relation by means of a steady bearing together with means providing for circulation of oil in order to dissipate spindle heat and to limit the bearing and oil temperatures.

These and other objects are effected by the invention as will be apparent from the following description and claim taken in connection with the accompanying drawing, forming a part of this application, in which:

Fig. 1 is a side elevational view with portions broken away and other portions shown in section; and, Fig. 2 is a detail sectional view, drawn to larger scale, of features of the bearing construction.

Referring now to the drawing more in detail, an elastic fluid turbine is shown, at 10, the turbine including a casing 11 and a vertical spindle 12 having a blade disc 13. Elastic fluid is supplied to the turbine through a governor valve 14 controlled by the governor, at 15, preferably provided at the upper end of the spindle.

Weight of the spindle is carried by the thrust bearing 16 comprised, for example, by segmental shoes 17 and by a collar 18 attached to the spindle, the collar bearing surface 20 cooperating with the bearing surfaces 21 on the shoes.

A steady or radial bearing 23 is arranged below the thrust bearing and it includes a journal 24 attached to the spindle and cooperating with the bearing surface of the bushing 25. The segmental shoes 17 and the bushing 25 are carried by a supporting or body structure 26 supported by a conical plate 27 from the upper side of the turbine casing 11.

The supporting plate 27 cooperates with structure 28 to provide a lubricant reservoir 30 encompassing the spindle 12, such structure preferably including an upwardly extending sleeve 31 about which is telescopically disposed the journal 24. Normally, oil is maintained in the reservoir 30 at such a level that the lower end of the steady bearing is submerged therein.

The lower portions 32 and 33 of the steady bearing 23 provide a viscosity pump including a helical groove 34 provided on one of said portions, preferably the journal, the pump having a capacity adequate to supply the steady and thrust bearings and to obtain sufficient flow to a cooler to dissipate heat flowing along the spindle from the interior of the turbine to the bearings. The viscosity pump discharges oil for passage between the bearing surface of the steady bearing and through the passage 35 and the conduit 36, including the valve 37, to the cooler 38. Oil is returned from the cooler to the reservoir by means of the conduit 39.

Oil escaping from the upper end of the steady bearing 23 is used to lubricate the thrust bearing; and, to this end, the stationary structure 26 and the bushing are constructed and arranged to provide an annular channel 41 for the segmental shoes 17, the thrust bearing surfaces 21 of the latter, the thrust bearing surface 20 of the thrust collar, the top edge of the annular wall 42 carried by the bushing and the drainage port 43 all being so relatively arranged as to assure maintenance of sufficient oil in the channel for proper lubrication of such bearing surfaces.

In operation, the major portion of the flow due to the viscosity pump is supplied from the latter to the cooler from which cooled oil is returned to the reservoir, thereby providing a cooling circuit for oil in order to dissipate heat. In addition, the viscosity pump supplies oil for passage between the bearing surfaces of the steady bearing to lubricate such surfaces, and the oil escaping from the upper end of the steady bearing flows over the top edge of the annular wall 42 to maintain the channel 41 filled sufficiently for lubrication of the thrust bearing surfaces 20 and 21, oil discharging from the channel 41, through the drain port 43, to the drain passage 44 for return to the reservoir 30. As shown, the drain passage 44 is provided by a conduit whose upper end is located in the upper portion of the governor housing to vent the reservoir.

If desired, oil may be supplied from the discharge side of the viscosity pump for lubricating any other suitable part or apparatus. For example, the governor, at 15, is shown as having parts thereof lubricated by means of a tube 45 supplied with oil from the passage 35 by means of an orifice 46.

The reservoir 30 is provided with a filling tube 47 by means of which the reservoir may be filled with oil to the desired level.

Should it be desired to isolate the cooler for any reason without shutting down the turbine, this may be done by closing the valve 37, whereupon the apparatus continues to operate to lubricate the bearing surfaces of the steady and thrust bearings but without cooling of the oil.

While the viscosity pump is shown as being incorporated in parallel circulating paths of flow of oil, the first path including the cooler and the second path including the series arrangement of steady and thrust bearings, it will be apparent that any suitable arrangement of these parts may be employed so long as the viscosity pump is effective to circulate oil to the cooler and the bearings.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claim.

What is claimed is:

In a lubricating system for a thrust bearing and for an adjacent and depending steady bearing adapted to support from its upper end a vertical spindle structure having a substantial portion thereof operative in an elevated temperature region, said steady bearing including a vertical journal element forming a part of the spindle structure and a cooperating bearing element, and said system including means for dissipating heat absorbed by the lubricant: means providing a chamber to hold oil so as to submerge the thrust bearing surfaces; a viscosity pump below the steady bearing and including an outer member connected to said bearing element and an inner member forming a part of the spindle structure, said members having cooperating cylindrical surfaces providing an annular space communicating and in axial alignment with the annular space of the steady bearing so that the latter space may be supplied with oil from the pump space; a reservoir arranged so that oil therein submerges the lower end of the viscosity pump, one of the viscosity pump members having a spiral groove formed in its cylindrical surface and the groove cooperating with the cylindrical surfaces to convey oil from the reservoir and through the annular space of the pump, the junction portion of the pump and bearing annular spaces, and the bearing annular space to said chamber; passageway means for withdrawing oil from the junction portion of said bearing and pump spaces and for returning such oil to the reservoir; and means providing for the return to the reservoir of oil overflowing from said chamber.

GEORGE F. GAYER.